United States Patent [19]

Nishina et al.

[11] 4,142,295
[45] Mar. 6, 1979

[54] TEST INDICATOR

[75] Inventors: Shingo Nishina; Tokuzo Nakaoki, both of Kawasaki, Japan

[73] Assignee: Kabushiki Kaisha Mitutoyo Seiskusho, Tokyo, Japan

[21] Appl. No.: 856,107

[22] Filed: Nov. 30, 1977

[30] Foreign Application Priority Data

Dec. 28, 1976 [JP] Japan .................. 51-159431

[51] Int. Cl.² .............................................. G01B 3/22
[52] U.S. Cl. .................................................. 33/172 B
[58] Field of Search ............ 33/169 R, 169 C, 172 B, 33/172 E, 172 D

[56] References Cited

U.S. PATENT DOCUMENTS

| 1,953,028 | 3/1934 | Sisson | 33/172 B |
|---|---|---|---|
| 2,296,707 | 9/1942 | Croston | 33/172 B |
| 2,466,380 | 4/1949 | Clark | 33/172 D |
| 2,830,373 | 4/1958 | Dahlberg | 33/248 |

FOREIGN PATENT DOCUMENTS

| 579314 | 7/1959 | Canada | 33/172 D |
|---|---|---|---|
| 417128 | 1/1967 | Switzerland | 33/172 B |

Primary Examiner—Richard R. Stearns
Attorney, Agent, or Firm—Brisebois & Kruger

[57] ABSTRACT

A test indicator comprising a holder to which is pivoted a measuring arm with a measuring tip; a casing equipped with a means for magnifying the displacement of said measuring tip; and an intermediate shaft which moves axially in response to pivoted displacement of the measuring tip, thereby transmitting pivotal displacement of the tip to the magnifying means, the holder being fitted to the casing for 360° rotation around the intermediate shaft so that the plane of pivotal movement of the measuring tip can be changed.

3 Claims, 3 Drawing Figures

TEST INDICATOR

BACKGROUND OF THE INVENTION

The present invention relates to a test indicator used for comparative measurement.

The test indicator is a conventional instrument which has been used for measuring a narrow spot, a deep place where a dial gauge cannot reach, the inner diameter of a hole, or the outer diameter of a shaft. The working principle is usually such that the displacement of a measuring member or tip of a measuring arm pivoted to the casing is transmitted by an axially slidable intermediate shaft within the casing to a built-in magnifying means in the casing so that the displacement can be indicated with magnification on the dial scale. The measuring arm, however, can pivot only in opposite directions in a single plane perpendicular to its pivot shaft and accordingly, depending on the place to be measured, the dial scale is turned and becomes obscured to the operator. In that case the operator has to peer around into the dial scale, thereby making the measurement inefficient.

SUMMARY OF THE INVENTION

The main object of the present invention is to provide a test indicator which permits a 360° change of the measuring direction.

Another object of the present invention is to provide a test indicator in which the measuring direction can be exactly varied by a specific angle.

Still another object of the present invention is to provide a test indicator in which the measuring direction can be exactly read off.

These objects, features and the advantages of the invention will become more apparent upon consideration of the following detailed specification and drawings.

DETAILED DESCRIPTION OF THE INVENTION

Figure 1:
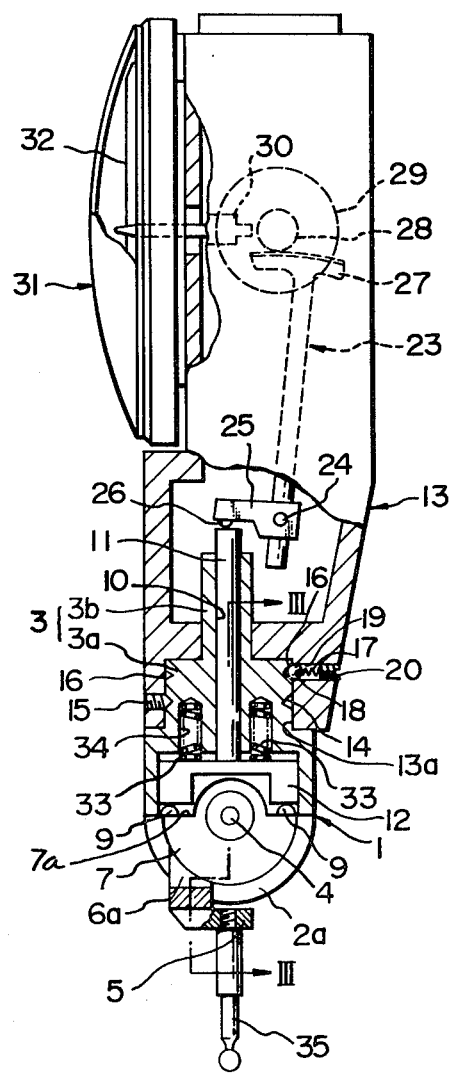
FIG. 1 is a longitudinal section view of a test indicator according to the present invention.
Figure 2:
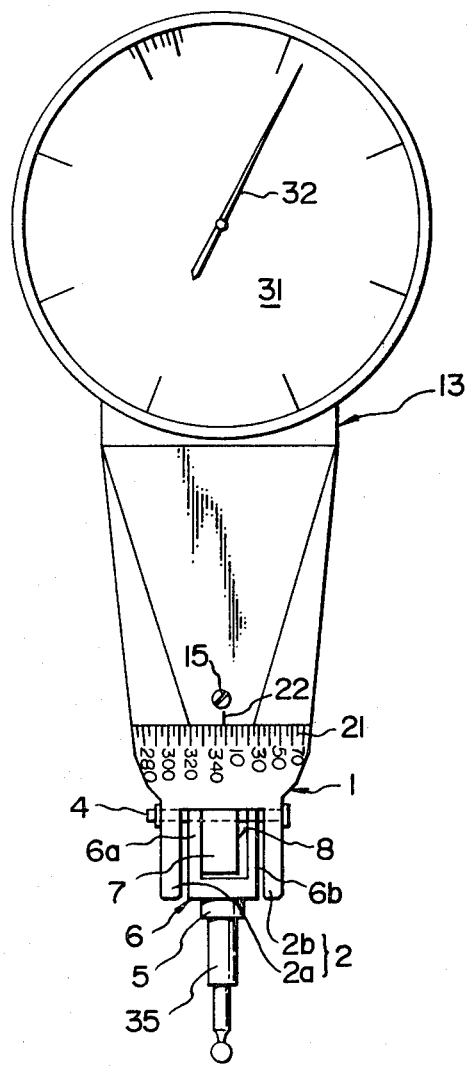
FIG. 2 is an elevation view of the test indicator shown in FIG. 1.

One embodiment of the present invention will now be described referring to the drawings.

In the drawings, 1 is the holder, at the tip 2 of which are a pair of parallel spaced apart ears 2a, 2b and at the base 3 of which is a large-diameter cylindrical body portion 3a coaxial with a small-diameter shaft 3b.

Figure 3:
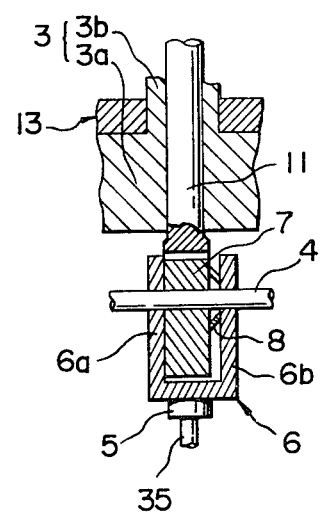
FIG. 3 is a view in section taken along line III—III of FIG. 1.

Extending through and between the opposed ears 2a and 2b is an arm-support shaft 4. Pivotally mounted on shaft 4 are parallel lug members 6a, 6b (FIG. 3) of a U-shaped part 6 fixed to the base of a measuring arm 5. A semi-circular cam plate 7 located between the opposed members 6a and 6b is rotatably fitted to the arm-support shaft 4. The cam plate 7 is urged toward the lug member 6a by a disc or belleville spring 8 interposed between the lug member 6b and a side surface of the cam plate 7. A specific predetermined frictional force is developed between the opposed lug members 6a, 6b and the disc spring 8 by the force of the disc spring 8. Semi-spherical contact members 9 are provided on the upper plane surfaces 7a of the cam plate 7 on opposite sides of the arm-support shaft 4, and are spaced the same distance from the arm-support shaft 4. A measuring tip 35 is rigidly screwed to the measuring arm 5.

A through bore 10 extends coaxially through the center of the body portion 3a and shaft 3b of the base 3 of the holder 1; and an intermediate shaft 11 can freely slide in this bore 10. At one end of the intermediate shaft 11 is an integrally formed contact piece 12 which engages the contact members 9,9.

A casing 13 of the test indicator has at its lower end a stepped bore 13a, to rotatably receive body 3a and shaft 3b of the holder 1. On the outside of the body 3a is an annular groove 14 which extends 360° circumferentially. The tip of an anti-slipout screw 15 screwed into the body fits into the annular groove 14, thereby preventing the holder 1 from slipping out of the casing 13 and restraining the holder from rotating, but permitting the holder to be manually rotated circumferentially.

On the outside of the body 3a are formed a plurality of recesses 16 spaced apart circumferentially at an angle of say, 90°. A ball 18 urged by a spring 17 fits into a selected recess 16, the spring 17 and the ball 18 being held in a hole 19 bored in the body 13 by a spring force-adjusting screw 20 threaded in the hole 19. A spring 33 is located between the holder 1 and the shoulder of the contact piece 12 and this spring is held in a hole 34 within the holder 1, thereby eliminating any axial play of the intermediate shaft 11.

On the outside of the holder 1 is a circumferential angular scale 21, while on the outside of the body 13, a reference line 22 is cut, so that the rotational displacement of the holder 1 relative to the body 13 can be read off.

The casing 13 holds a built-in means 23, as illustrated in FIG. 1, for magnifying or amplifying the displacement of the intermediate shaft 11. The magnifying means 23 consists of an arm 25 pivoted to the body 13 by a pin 24; a semi-spherical contact member 26 integral with the arm and contacting the end of the intermediate shaft 11; a sector gear 27 fixed to the arm 25; a pinion 28 meshing with the sector gear 27; a crown wheel 29 fixed to pinion 28; a pinion 30 meshing with said crown wheel 29; and a pointer 32 of the dial scale 31 secured to the stem tip of pinion 30.

The working of a test indicator thus constructed will now be described.

When the measuring tip 35 is pivoted around the arm-support shaft 4, the frictional force caused by the disc spring 8 between the measuring arm 5 and the cam plate 7 causes the cam plate 7 to rotate with the measuring arm 5 as a unit. As a result, the intermediate shaft 11 is displaced toward the body 13 via the contact member 9 and the contact piece 12, thereby causing arm 25 to pivot upwardly in FIG. 1. Thereupon the sector gear 27 fixed to arm 25 is rotated and in consequence, with the pointer 32 turning via the pinion 28, the crown wheel 29 and the pinion 30, the displacement of the intermediate shaft 11 is magnified. Thus a magnified displacement of the measuring member 35 is indicated by the pointer 32 on the dial scale 31.

In this embodiment a series of gears are employed as the means for magnifying the displacement of the intermediate shaft 11, but the displacement can be digitally displayed with the aid of a differential transformer which electrically magnifies the displacement of the intermediate shaft 11.

When the pivotal direction of the measuring tip 35 is to be changed, the holder 1 can be circumferentially rotated relative to the body 13. The direction of pivotal movement of the measuring tip 35 relative to the casing 13 can be exactly changed stepwise by a specific angle by rotating holder 1 so the ball 18 seats in a selected recess 16. This can be done also by threading a clamp screw into the casing 13 and thereby clamping the body 3a of the holder 1 so that the rotational direction of the measuring tip 35 can be steplessly fixed at any arbitrary angle; and in that case the rotational angle of the holder 1 can be exactly read off from the reference line 22 provided on the casing 13 and the angular scale 21 provided on the holder 1.

According to the present invention, in which the holder, equipped with an intermediate shaft and a measuring tip, is mounted in a casing for rotational adjustment about the axis of the intermediate shaft, with a built-in magnifying means to indicate the axial displacement of the intermediate shaft, the pivotal direction of the measuring tip can be changed to facilitate using the instrument. When the holder is rotated relative to the casing, there is no possibility of the intermediate shaft and the holder or measuring tip rotating relative to each other by means of the spring which urges the contact piece toward the contact member. Thus with no change in the relative angular position between the intermediate shaft and the holder there is no possibility of the transmitting precision of the displacement of the measuring tip declining as the result of the holder being rotated relative to the casing.

When a plurality of recesses 16 are provided with spacing of specific angles in the circumferential direction at the base of the holder and a ball engaged in these recesses is held on the casing and urged toward the holder, the rotational angle of the holder relative to the casing, i.e., the plane of pivotal movement of the measuring tip can be exactly changed in steps.

Further, with the reference line and the angular scale provided respectively on the outside of the casing and on the outside of the holder, the displacement of the holder relative to the body can be exactly known. Furthermore, when a clamp screw is applied to the casing so that the holder can be fixed to the casing with this screw, the additional advantage is obtained that the holder can be steplessly fixed to the casing at any circumferential position.

What is claimed is:

1. A test indicator comprising, a measuring arm, a cam connected to the measuring arm and pivoted to an end of a holder, a measuring tip secured to the end of said measuring arm; an intermediate shaft mounted in said holder for axial displacement; cooperating means on said cam and said intermediate shaft for displacing said shaft axially in response to pivotal movement of the measuring arm and comprising a contact surface on said said shaft and facing toward said cam, and a pair of spherically curved contact members on said cam and engaging the contact surface of the shaft, said contact members being on opposite sides of and spaced the same distance from the axis of said shaft; a casing; means in said casing for magnifying the displacement of said intermediate shaft; means for mounting said holder on said casing for rotational adjustment of said holder with respect to the casing about the axis of said shaft and wherein said holder has a plurality of recesses circumferentially spaced apart at specific angles around its body; a ball engagable in said recesses is held in the casing; said ball is urged toward said body by a spring, and a screw threaded into the casing provides for adjusting the force of said spring.

2. The test indicator of claim 1, wherein said means mounting said holder for rotation comprises a cylindrical body of the holder rotatably fitted in a hole of the casing, an annular groove formed circumferentially around the holder, and a tip of a screw fitted in the body and extending into said annular groove.

3. The test indicator of claim 2, wherein a reference line is provided on one of the casing and the holder; and an angular scale is provided on the other of the holder and the casing.

* * * * *